(12) United States Patent
Vasapollo

(10) Patent No.: US 9,402,150 B2
(45) Date of Patent: Jul. 26, 2016

(54) HIGH-DATA-RATE LOW-CURRENT CONSUMPTION EASY-TO-IMPLEMENT MINIATURIZED WIRELESS MICRO-USB DONGLE

(71) Applicant: Curzio Vasapollo, Tokyo (JP)

(72) Inventor: Curzio Vasapollo, Tokyo (JP)

( * ) Notice: Subject to any disclaimer, the term of this patent is extended or adjusted under 35 U.S.C. 154(b) by 84 days.

(21) Appl. No.: 14/304,912

(22) Filed: Jun. 14, 2014

(65) Prior Publication Data

US 2015/0365507 A1 Dec. 17, 2015

(51) Int. Cl.
*H04W 4/00* (2009.01)
*H04M 1/725* (2006.01)
*H04M 1/02* (2006.01)

(52) U.S. Cl.
CPC .......... *H04W 4/008* (2013.01); *H04M 1/72527* (2013.01); *H04M 1/0274* (2013.01); *Y02B 60/50* (2013.01)

(58) Field of Classification Search
CPC .......... H04B 1/38; H04W 4/00; H04W 4/008; H01Q 1/2275
USPC ................................................. 455/41.2, 557
See application file for complete search history.

(56) References Cited

U.S. PATENT DOCUMENTS

| | | | | |
|---|---|---|---|---|
| 8,274,447 B2 * | 9/2012 | Zhang | .................. | H01Q 1/2275 343/872 |
| 8,711,966 B2 * | 4/2014 | Schroeder | ................ | H01Q 1/08 375/267 |
| 8,712,245 B1 * | 4/2014 | Alao | ....................... | G08C 23/04 398/106 |
| 9,104,384 B2 * | 8/2015 | Schade | ................... | G06F 1/183 361/679.32 |
| 9,166,644 B2 * | 10/2015 | Yoon | ........................ | H04B 1/38 |
| 2006/0025071 A1 * | 2/2006 | Yamazaki | ......... | G06F 17/30265 455/3.06 |
| 2007/0060089 A1 * | 3/2007 | Owen | .................... | H04W 48/16 455/229 |
| 2007/0191059 A1 * | 8/2007 | Liow | ................... | H04M 1/0254 455/558 |
| 2008/0003947 A1 * | 1/2008 | Morris | ................ | H04W 76/025 455/41.2 |
| 2008/0081610 A1 * | 4/2008 | Bhalla | ............... | H04M 1/72519 455/425 |
| 2009/0023335 A1 * | 1/2009 | Su | ....................... | H01R 13/6658 439/607.01 |
| 2013/0194156 A1 * | 8/2013 | Iellici | .................... | H01Q 1/2275 343/867 |
| 2015/0286835 A1 * | 10/2015 | Azoulai | ............. | G06F 21/6218 713/193 |

OTHER PUBLICATIONS

ASUS USB-BT400 USB 2.0 Bluetooth 4.0 Adapter http://www.newegg.com/Product/Product.aspx?Item=N82E16833320166.

(Continued)

*Primary Examiner* — Blane Jackson

(74) *Attorney, Agent, or Firm* — Russ Weinzimmer & Associates, PC

(57) ABSTRACT

A dongle is provided that can be plugged into the micro-USB port of a mobile device that supports USB host mode. The dongle provides control of the radio circuitry housed within the dongle to applications running on a smartphone. The dongle is highly miniaturized, providing a small form factor that is useful to hardware manufacturers that want to move away from using Bluetooth, while enhancing aesthetics and practicality. The dongle enables high data rate devices such as medical, diagnostic, and physiological sensing devices, to realize significant energy savings, facilitating greater miniaturization, and increased consumer adoption. Also, the dongle allows manufacturers of these types of devices to avoid dealing with the overhead and complexity of large-scale mesh networking imposed by protocols governed by large consortiums, such as Bluetooth.

13 Claims, 9 Drawing Sheets

(56) References Cited

OTHER PUBLICATIONS

Mini MicroSD Reader Accessible to Android Smartphones & Tablets http://www.androidpolice.com/2013/04/08/mini-microsd-reader-accessible-to-android-phones-and-tablets-via-microusb-port-gets-funded-on-kickstarter/.

USB A 2.0 female to Micro USB B male Cable Adapter http://www.amazon.co.uk/female-Micro-male-Cable-Adapter/dp/B005GI2VMG.

Toshiba TransferJet http://phandroid.com/2013/09/04/toshiba-transferjet/.

Artaflex 2.4 GHz DSSS Wireless USB Dongle AWAC24U data sheet.

* cited by examiner

| ID = GND | | Peripheral plugged in. Mobile powers system in USB Host mode. Battery disconnected. |
|---|---|---|
| ID != GND | V+ >= 3V | Charging via USB connector. Mobile in USB slave mode. Battery and phone both charge. |
| ID != GND | V+ <= 2.5V | Battery charges phone. Mobile in USB slave mode. |

HIGH-DATA-RATE LOW-CURRENT CONSUMPTION EASY-TO-IMPLEMENT MINIATURIZED WIRELESS MICRO-USB DONGLE

FIELD

The present invention relates generally to communication between computing devices, and more particularly to short-range wireless communication between wearable and/or mobile devices.

BACKGROUND

Wireless dongles that can be plugged into a USB port of a desktop computer or a laptop computer for extending the wireless connectivity options of the computer have been available for a long time. Among these, Bluetooth USB dongles, such as the USB-BT211 by ASUS, are ubiquitous at the time of this writing.

Nearly all modern mobile devices, such as smartphones and tablet PCs, have a built-in ability to interface wirelessly by means of Wi-Fi, Bluetooth, and more recently Bluetooth Low Energy.

Electronic products interfacing with computing devices, such as mobile phones, smartphones, and tablet PCs, are becoming commonplace. To achieve connectivity with these computing devices, these electronic products must use a wireless transmission protocol, such as Bluetooth, which is supported by the mobile devices. Unfortunately, there are many types of products for which Bluetooth is not ideal, such as products that do not benefit from mesh networking. These products must, at the time of writing, nevertheless bear the full overhead of Bluetooth's layered protocol complexity to achieve even the simplest peer-to-peer data transfer with a smartphone. The staggering complexity of the protocol imposes a minimum bound on airtime required for a given type of communication, and consequently on current consumption and battery size.

Bluetooth Low Energy is similarly complex to understand and support, and is unfortunately often unable to provide its promised power savings, especially for high bandwidth applications, because of the low data rates to which it is limited by design. Operating systems by manufacturers such as Apple further arbitrarily reduce and cap these already restrictive Bluetooth Low Energy data rates.

Wi-Fi is another protocol supported by nearly all mobile devices. However, its current consumption is the highest among Bluetooth, Bluetooth Low Energy, and WiFi, and so WiFi is therefore rarely preferred over Bluetooth.

USB On-the-Go (OTG) is a specification introduced in 2001 which allows USB devices such as a digital audio player or a mobile phone, to act as a host, thereby allowing a USB peripheral device, such as a USB flash drive, a digital camera, a mouse, or a keyboard to be attached to the USB host device. Unlike conventional USB slave systems, USB OTG systems can drop the hosting role and act as normal USB devices when attached to another host.

Support for OTG, commonly referred to as "USB Host mode" in mobile phone specifications, was introduced in 2011 with Android OS v.3.1. The Nokia N8 smartphone has supported OTG since 2010.

Nevertheless, known medical devices and wearable devices typically employ mesh networking, sensor networks, and Bluetooth.

SUMMARY

The wireless dongle of the invention overcomes significant shortcomings of Bluetooth, thereby substantially reducing the barrier to entry presented by Bluetooth for new manufacturers. The invention facilitates miniaturization of wearable devices that connect to smartphones by reducing power requirements of the wearable devices, and provides the functionality of "radio dongles", which have for decades extended the wireless transmission capabilities of laptop and desktop PCs. The invention provides a radio (wireless) dongle which takes advantage of the micro-USB port on USB OTG-enabled mobile phones so as to enable low-power, high-data-rate miniaturized devices that can easily connect to a smartphone. The invention provides a miniaturized dongle that is small relative to a typical smartphone. The miniature dongle can be plugged into the micro-USB port of a mobile device, and provides high-data-rate, low-current consumption, and simple-to-implement wireless connectivity.

The dongle of the invention is plugged into the micro-USB port of a mobile device which supports OTG (also known as USB host mode); for example an Android smartphone like the Galaxy Note 3. It provides to applications running on the smartphone control of the radio circuitry housed within the dongle. The radio circuitry can be used to exchange data with an external device, such as a miniaturized, wearable physiological monitoring device. Unlike Bluetooth, Zigbee, and other complex mesh networking protocols, the dongle of the invention does not natively allow multiple nodes to intercommunicate. It does not support complex networking out of the box. This is not a drawback, because under most circumstances, a user wishes to only utilize one communicating device at a time. This simplification in the wireless protocol enables hardware and application developers to more quickly prototype and roll out new products and applications. Furthermore, due to the chip used in an embodiment of the invention, the absence of mesh networking-related overhead allows energy savings comparable to Bluetooth Low Energy, but with data rates comparable to regular Bluetooth. When some sort of networking functionality is desired, by using the chip of an embodiment of the invention, the firmware and application developers are nevertheless able to roll out a custom communication protocol that allows optimization of mission critical parameters. In other words, the complex interplay between data rate, current consumption, and battery size is entirely within the control of the application developer. This is not the case for protocols natively supported by smartphones and tablet PCs, such as Bluetooth.

Furthermore, the dongle of the invention is highly miniaturized. For example, unlike other micro-USB peripherals available on the market at the time of writing that are intended to be plugged into a mobile device, there remains no gap between the edge of the mobile device and the dongle when the dongle is inserted.

The small form factor of the dongle of the invention is important for hardware manufacturers moving away from using Bluetooth, because it does not impose a penalty for the end user of the hardware in terms of aesthetics and practicality.

The dongle of the invention enables high data rate devices, such as medical, diagnostic, and physiological sensing devices, to realize significant energy savings, thereby enabling greater miniaturization and increased consumer adoption. At the same time, it allows manufacturers of these types of devices to avoid dealing with the overheads and complexity of large scale mesh networking imposed by protocols driven by large consortiums, such as Bluetooth.

One general aspect of the invention is a wireless micro-USB dongle for use with a mobile device. The dongle includes: a circuit board including at least one integrated circuit, the at least one integrated circuit being capable of communication using a radio data signal, every byte of the radio data signal being user-determinable; a solder-mount micro-USB male connector having a largest surface that is mounted parallel to the circuit board; an antenna connected to an integrated circuit of the circuit board; and an enclosing shell having a hole through which the solder-mount micro-USB male connector extends, and having a portion abutting substantially directly against an edge of the mobile device having a female connector when the male connector is inserted into the female connector.

In some embodiments, the circuit board has an extended exposed portion so as to allow an edge of the circuit board to abut substantially directly against an edge of the mobile device having a female connector when the male connector is inserted into the female connector.

In some embodiments, the circuit board includes an integrated circuit having a USB controller, a microcontroller, and a radio transceiver.

In some embodiments, the enclosing shell is formed using overmolding so there is a thin (0.6 mm to 1 mm) layer. In further embodiments, the overmolding material is one of: PVC or plastic.

In some embodiments, the antenna is a chip antenna positioned over the solder-mount micro-USB male connector.

In some embodiments, the antenna is a conductive enclosure.

In some embodiments, the dongle further includes: an amplifier that has an impedance that is substantially identical to an impedance of the antenna.

In some embodiments, the circuit board is overmolded using rubber or plastic such that the overmolded layer constitutes the enclosing shell.

In some embodiments, the enclosing shell is made of a conductive material, and the enclosing shell is also the antenna.

In some embodiments, there is substantially no air gap between the dongle and the host device when the dongle is plugged into the host device.

In some embodiments, the total thickness (measured perpendicular to the surface of the circuit board) of the dongle is less than 1 cm.

In some embodiments, the at least one integrated circuit is "chip on board".

Another general aspect of the invention is a case for a mobile phone or a tablet. The case includes: a circuit board having at least one integrated circuit; an enclosing shell having an internal male connector capable of being plugged into a port on the mobile phone, and an external female connector; an antenna connected to the at least one integrated circuit of the circuit board; and a battery connected to the circuit board.

In some embodiments, the external female connector is a female micro-USB connector.

BRIEF DESCRIPTION OF THE DRAWINGS

The invention will be more fully understood by reference to the Detailed Description, in conjunction with the following figures, wherein.

DETAILED DESCRIPTION

Figure 1:
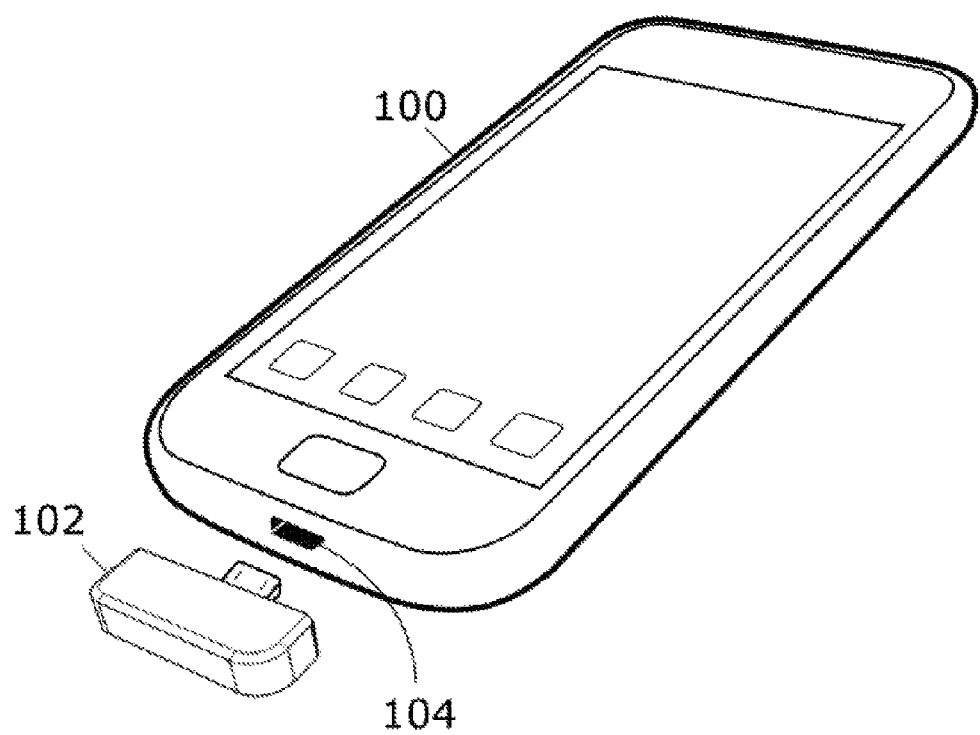
FIG. 1 is a line drawing of a smartphone situated near a dongle of the invention.

FIG. 1 shows a smartphone 100 and a micro-USB dongle 102 of the invention, the smartphone 100 having a female micro-USB connector 104.

Figure 2:
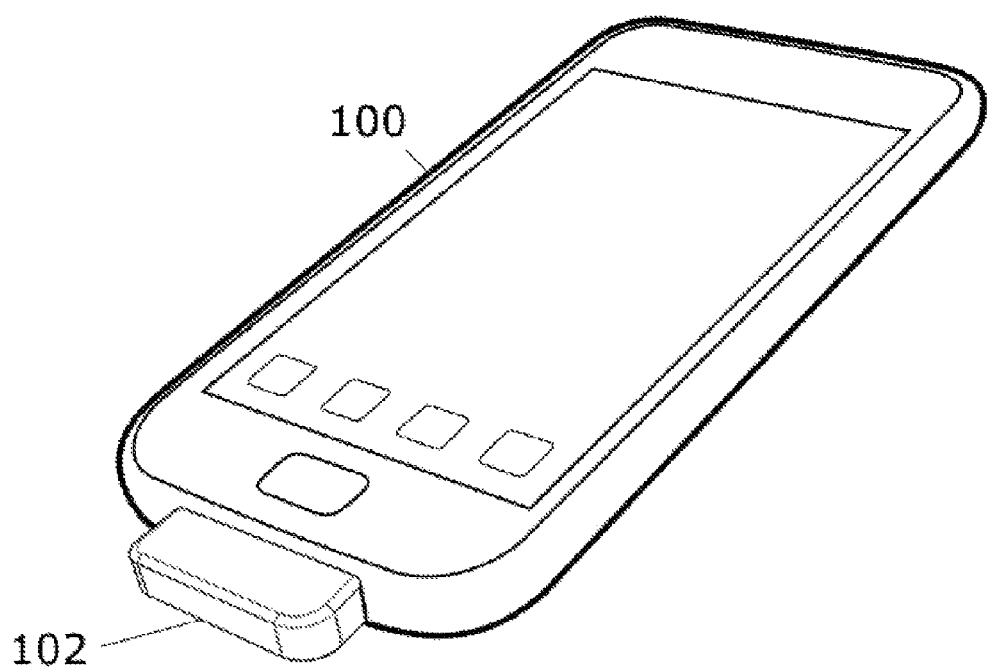
FIG. 2 is a line drawing of the smartphone and the dongle of FIG. 1, the dongle having been inserted into the smartphone

FIG. 2 shows the dongle 102 inserted into the smartphone 100.

Figure 3A:
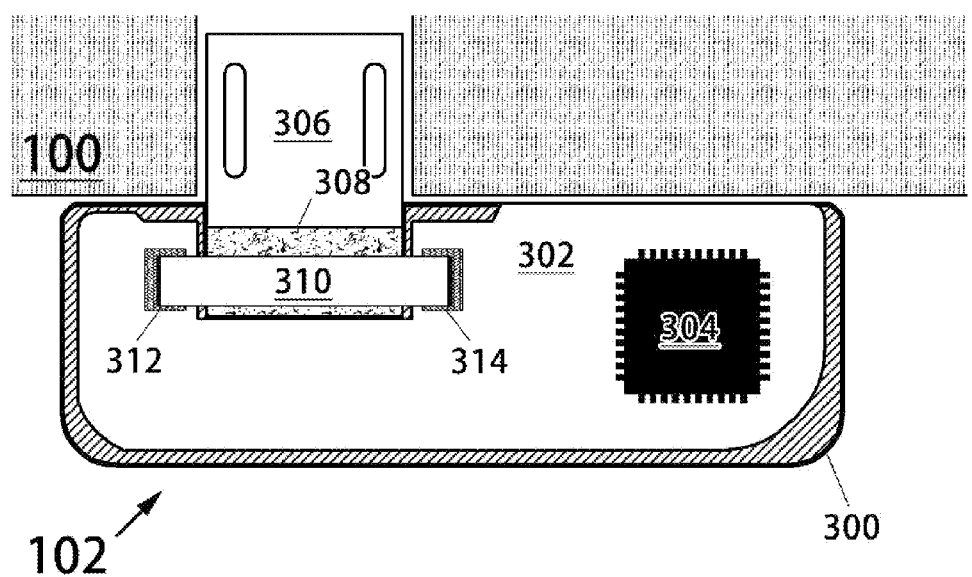
FIG. 3A is a schematic drawing of the internals of the dongle of FIG. 1, this embodiment using a ceramic encapsulated antenna.

FIG. 3A schematically shows the components inside the dongle 102. A thin rubber/PVC layer forms an enclosing shell 300 which encapsulates a circuit board 302. However, the enclosing shell 300 does not fully cover the edge of the circuit board 302, which edge is intended to come in contact with the edge of the smartphone 100, thereby reducing the size of the dongle 102.

A single integrated circuit 304 handles USB connectivity, runs user code (standard microcontroller functionality), and outputs radio frequency waves through an antenna 310, requiring only a crystal oscillator (not shown) and some passive components such as capacitors, resistors, and inductors (not shown). For example, CYRF69213 by Cypress can be used. A male solder-mount micro-USB connector is shown in its main constituent components: a metallic housing 306, which is plugged into a female receptacle 104 on the smartphone 100; and a non-conductive body 308, required for its construction and stability.

To prevent the non-conductive body 308 from creating an undesirable gap between the dongle 102 and the smartphone 100 when the dongle is plugged in, the circuit board 302 extends to the left and right sides of the body 308. The thickness of the circuit board 302 is such that the upper surface of the non-conductive body 308 is flush with the upper surface of the circuit board 302; an antenna 310 is soldered above the non-conductive body 308 across the slot in the circuit board 302, more precisely between two pads 312 and 314 on the circuit board 302. The antenna 310 is long enough to reach from one side of the connector to the other, but as short as possible without sacrificing its gain, so as to minimize the size of the device. Thus, the surface area that would normally be occupied by the non-conductive body 308 is reclaimed.

Figure 3B:
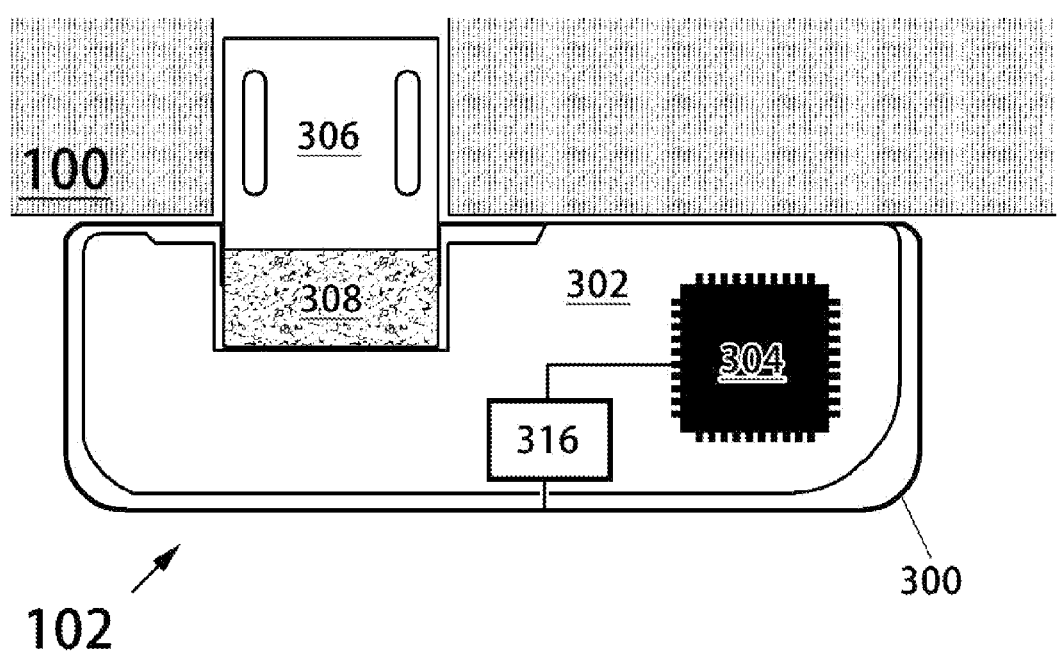
FIG. 3B is a schematic drawing of the internals of an alternate embodiment of the dongle of FIG. 1, this embodiment using a conductive shell as antenna.

FIG. 3B schematically shows the components of an alternate embodiment of the dongle of FIG. 3A, this embodiment having a conductive shell 300 used as an antenna. In this embodiment, the radio output of the integrated circuit 304 is connected to the shell through a balun or impedance matching circuitry 316.

Figure 3C:
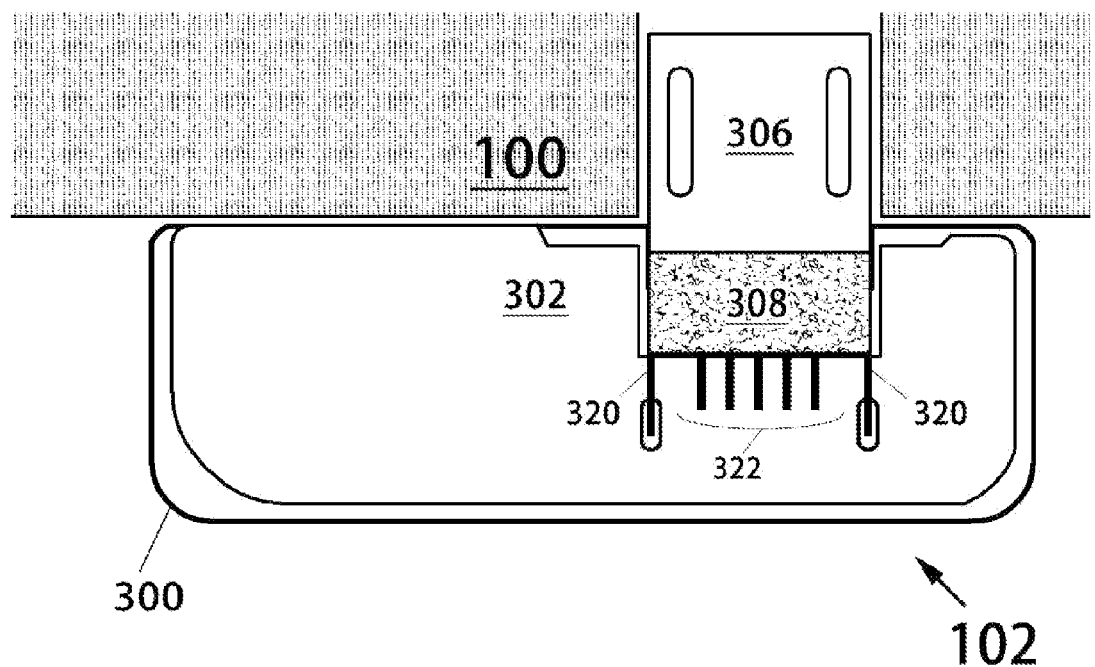
FIG. 3C is a schematic drawing of the underside of the dongle of FIG. 3A.

FIG. 3C shows the under-side of the dongle of FIG. 3B. In FIG. 3C the five solder mount pins 322 and the two through-hole positioning posts 320 of the male micro-USB connector 306, 308 are visible.

Figure 4:
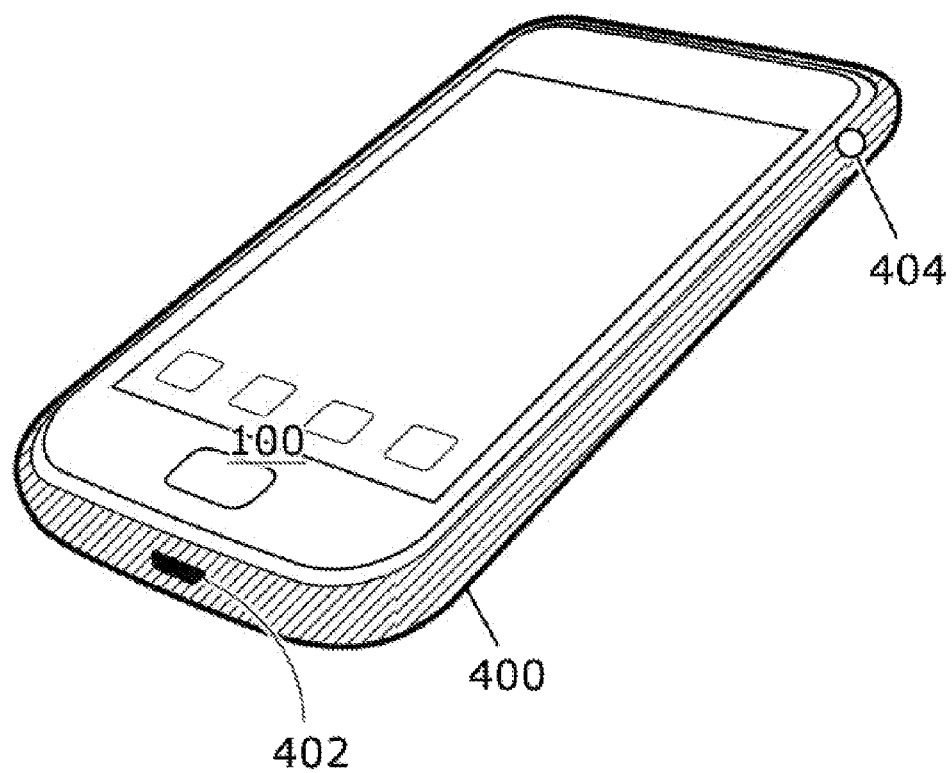
FIG. 4 is a line drawing of a smartphone enclosed in a wireless connectivity case of the invention, the case having a button and covering the smartphone.

FIG. 4 shows a smartphone case 400 covering a smartphone 100. The case has a female micro-USB connector 402, and a male micro-USB connector (not shown). The case also has a switch 404 used to switch between "dongle" function (in which the case's internal circuitry, residing on the circuit board 600, is the USB slave device) and allowing external USB connectivity.

Figure 5:
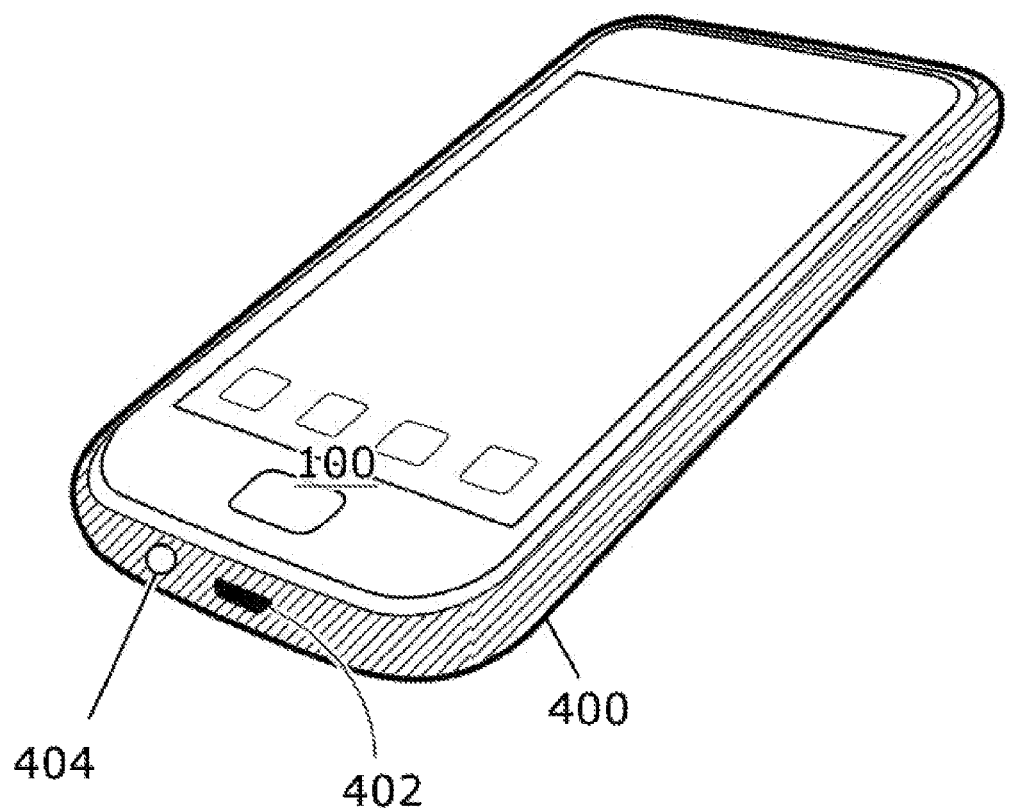
FIG. 5 is a line drawing of the smartphone enclosed in an alternate embodiment of the wireless connectivity case of FIG. 4, this embodiment having the button located near the micro-USB port.
Figure 6:
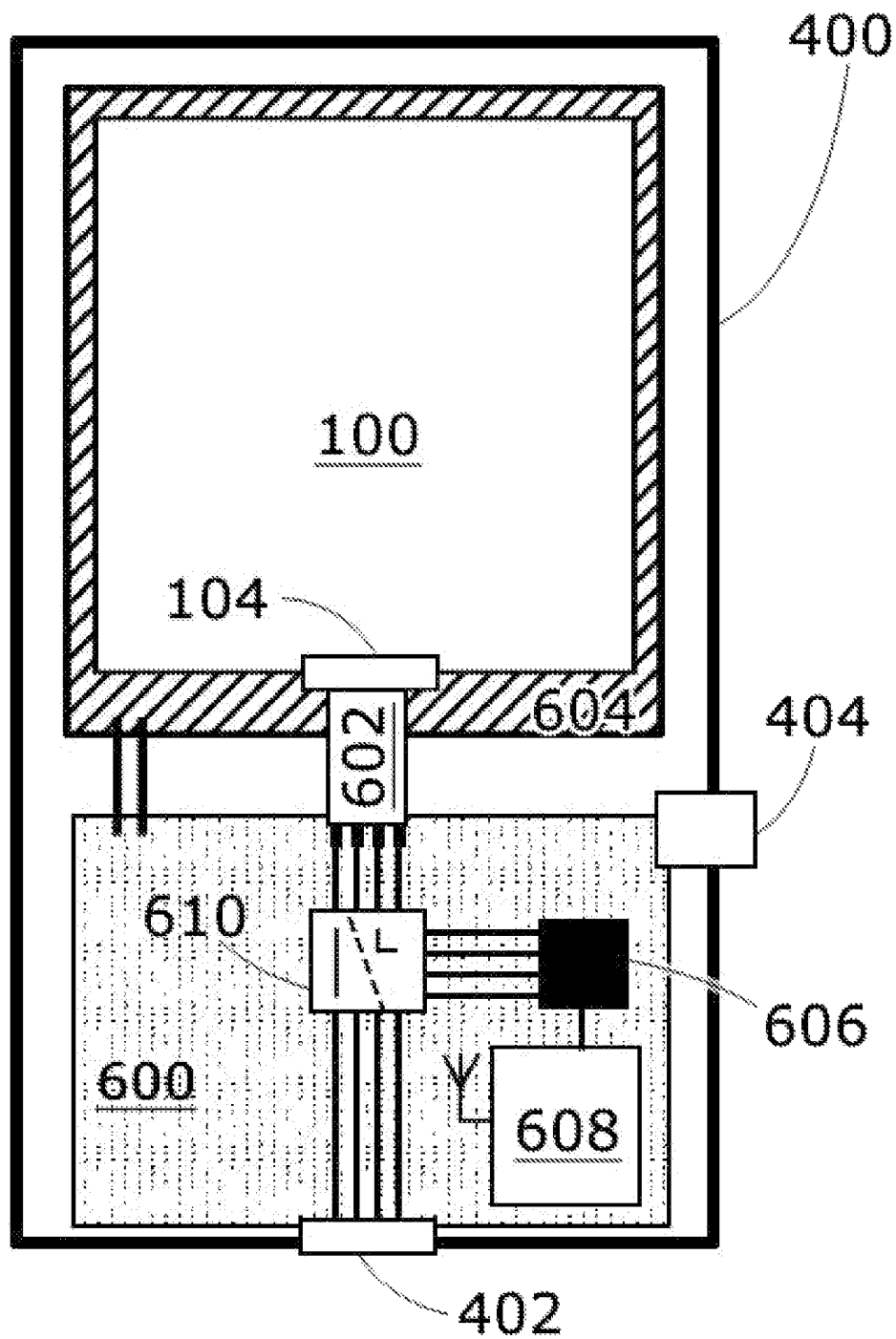
FIG. 6 is a schematic drawing of the internals of the wireless connectivity case of FIG. 4. in connected relationship with the smartphone.

FIG. 5 shows the smartphone case 400 with the switch 404 located near the micro-USB port FIG. 6 shows a schematic drawing of the smartphone case 400 containing the smartphone 100. A male connector 602 is plugged into the female micro USB connector 104 on the smartphone 100. The male connector 602 is soldered onto a circuit board 600 embedded within the case 400. A female micro-USB connector 402 connected to the circuit board 600 is exposed to the outside to allow micro-USB connectivity. A battery 604 is connected to the circuit board 600 and embedded within the case 400, for example, behind the smartphone 100. A switch 404 is connected to the circuit board 600, and has the function of switching between two modes. In the first mode, the external USB mode, switching circuitry 610 allows the mobile phone's micro USB connector 104 to communicate with the "outside world" via the outside female connector 402. In this state, circuitry inside the case 400 does not communicate with the mobile phone 100 through the USB bus.

Alternatively, in the second mode, switching circuitry 610 disconnects the outside connector 402 and patches the USB bus to an internal USB microcontroller 606. In this mode, the outside connector 402 is disconnected from the system. The internal USB microcontroller 606 functions as a slave USB device and is connected to radio circuitry 608 including an antenna.

Figures 7, 8:
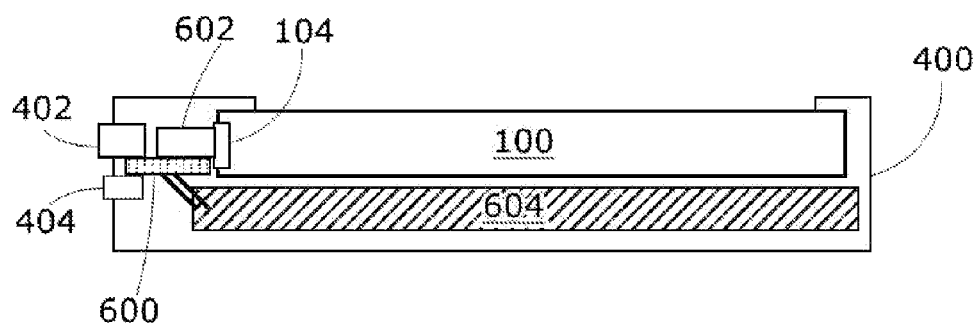
FIG. 7 is a side cross-sectional view of the smartphone and wireless connectivity case of FIG. 4, showing the spatial arrangement of the components of the wireless connectivity case.
FIG. 8 is a table showing three states of the USB port pins of the wireless connectivity case of FIG. 4, and the corresponding operation modes.

FIG. 7 shows a possible, simplified three-dimensional arrangement of the components 104, 402, 404, 600, 602 of FIG. 6. The case 400 encloses the mobile phone 100, and the battery 604 is under the mobile phone 100 and embedded within the case 400.

FIG. 8 shows a truth table illustrating three states of the USB bus and USB configuration of the mobile device case 400 shown in FIG. 6. In the first state, the ID line is brought low externally. This indicates a peripheral is plugged into the outside connector 402 of the case 400. When this condition is detected, the battery 604 is disconnected from the system, and the switching circuitry 404 patches the outside connector 402 lines into the micro USB connector 104 of the smartphone 100.

In the second state, the ID line is not grounded, indicating no peripheral is plugged into the outside connector 402 of the case 400. Voltage on the V+ line of the outside connector 402 is above 3V indicating an external power source is connected. When this condition is detected, the battery 604 is charged through the outside connector 402, and the switching circuitry 404 patches the outside connector 402 lines into the micro USB connector 104 of the smartphone 100, allowing the mobile phone 100 to charge.

In the third state, the ID line is not grounded, indicating no peripheral is plugged into the outside connector 402 of the case 400. Voltage on the V+ line of the outside connector 402 is below 2.5V, indicating an external power source is not connected. When this condition is detected, the battery 604 is connected to the V+ and GND lines of the micro USB connector 104, thereby charging the mobile phone.

It is to be noted that at the time of writing, mobile phones cannot be charged when in USB Host mode. Therefore it is not possible for the battery 604 to recharge the mobile phone 100 when the mobile phone 100 is in USB Host mode. This is the reason why the truth table in FIG. 8i is used. However, as technology develops, eventually a means for charging a mobile phone when in USB Host mode will be introduced, either within the USB port or externally; and with trivial changes to the system herein described, the internal battery 604 will be able to recharge the mobile phone while an external USB slave peripheral is connected, or when the case is functioning in "dongle" mode and the circuitry on circuit board 600 is the USB slave, enabling multiple benefits such as extended battery life, seamless connectivity to external devices, and the case's internal radio circuitry functions, to be realized at the same time.

Other modifications and implementations will occur to those skilled in the art without departing from the spirit and the scope of the invention as claimed. Accordingly, the above description is not intended to limit the invention except as indicated in the following claims.

What is claimed is:

1. A wireless micro-USB dongle for use with a mobile device, the dongle comprising:
   a circuit board including at least one integrated circuit, the at least one integrated circuit being capable of communication using a radio data signal, every byte of the radio data signal being user-determinable;
   a solder-mount micro-USB male connector having a largest surface that is mounted parallel to the circuit board;
   an antenna connected to an integrated circuit of the circuit board; and
   an enclosing shell having a hole through which the solder-mount micro-USB male connector extends, and having a portion abutting substantially directly against an edge of the mobile device having a female connector when the male connector is inserted into the female connector.

2. The dongle of claim 1, wherein the circuit board has an extended exposed portion so as to allow an edge of the circuit board to abut substantially directly against an edge of the mobile device having a female connector when the male connector is inserted into the female connector.

3. The dongle of claim 1, wherein the circuit board includes an integrated circuit having a USB controller, a microcontroller, and a radio transceiver.

4. The dongle of claim 1, wherein the enclosing shell is formed using overmolding so there is a thin (0.6 mm to 1 mm) layer.

5. The dongle of claim 4, wherein the overmolding material is one of: PVC or plastic.

6. The dongle of claim 1, wherein the antenna is a chip antenna positioned over the solder-mount micro-USB male connector.

7. The dongle of claim 1, wherein the antenna is a conductive enclosure.

8. The dongle of claim 1, further including:
   an amplifier that has an impedance that is substantially identical to an impedance of the antenna.

9. The dongle of claim 1, wherein the circuit board is overmolded using rubber or plastic such that the overmolded layer constitutes the enclosing shell.

10. The dongle of claim 1, wherein the enclosing shell is made of a conductive material, and the enclosing shell is also the antenna.

11. The dongle of claim 1, wherein there is substantially no air gap between the dongle and the host device when the dongle is plugged into the host device.

12. The dongle of claim 1, wherein the total thickness (measured perpendicular to the surface of the circuit board) of the dongle is less than 1 cm.

13. The dongle of claim 1, wherein the at least one integrated circuit is "chip on board".

* * * * *